US005493855A

United States Patent [19]

Walters et al.

[11] Patent Number: 5,493,855

[45] Date of Patent: Feb. 27, 1996

[54] TURBINE HAVING SUSPENDED ROTOR BLADES

[75] Inventors: George R. Walters, Milpitas; A. Ozer Arnas, Sacramento, both of Calif.

[73] Assignee: Alfred E. Tisch, Mountain View, Calif.

[21] Appl. No.: 185,078

[22] Filed: Jan. 21, 1994

Related U.S. Application Data

[63] Continuation of Ser. No. 992,946, Dec. 17, 1992, abandoned.

[51] Int. Cl.[6] .................................. F01D 5/12; F02C 7/00

[52] U.S. Cl. ................... 60/39.75; 415/173.1; 415/173.6

[58] Field of Search ........................ 60/39.75; 416/223 A; 415/170.1, 173.1, 173.2, 173.6, 115, 116, 140, 141; 384/99, 107, 114, 121

[56] References Cited

U.S. PATENT DOCUMENTS

| | | | |
|---|---|---|---|
| 2,963,268 | 12/1960 | Smile et al. | 415/173.6 |
| 3,301,526 | 1/1967 | Chamberlain | 415/115 |
| 3,301,527 | 1/1967 | Kercher | 415/115 |
| 3,309,151 | 3/1967 | Sherman | 415/173.6 |
| 4,629,397 | 12/1986 | Schweitzer | 416/96 R |

*Primary Examiner*—Richard A. Bertsch
*Assistant Examiner*—William Wicker
*Attorney, Agent, or Firm*—Townsend and Townsend and Crew; Kenneth R. Allen

[57] ABSTRACT

A high-efficiency turbine includes low-tensile-strength rotor blades capable of high-temperature operation (such as ceramic) which are mounted on fluid bearings between a continuous rim and a hub, the rim being connected via high-tensile-strength spokes through each blade to the hub. The fluid provides internal support to the blade structure and provides a bearing medium and force with which to maintain blade position under compression. One or more fluids may be employed as coolants in passages within the blade to establish an adequate temperature gradient between blade surface and the associated spoke to minimize spoke failure due to overheating.

15 Claims, 11 Drawing Sheets

TURBINE HAVING SUSPENDED ROTOR BLADES

This is a continuation application of U.S. Ser. No. 07/992,946 filed Dec. 17, 1992, now abandoned.

BACKGROUND OF THE INVENTION

This invention relates to gas turbine engines having high turbine inlet temperatures and ceramic rotor blades. More specifically, the invention relates to construction of rotors that carry ceramic blades.

In order to understand the invention, it is helpful to consider operation and structure of conventional gas turbines. FIG. 1 is a schematic of a basic idealized gas turbine system useful for explaining the limitations of conventional gas turbine engines. In the engine schematic of FIG. 1, intake air 10 enters the compressor 11. Compressor 11 increases the pressure of air 10 with little heat loss and consequent rise in temperature (substantially adiabatic) and outputs compressed air 18 to a combustion chamber 12. In combustion chamber 12, compressed air 18 mixes with fuel 13 and the resulting air/fuel mixture ignited to raise the temperature of the air under constant pressure conditions. Fast moving hot gas 14 exiting combustion chamber 12 feeds into turbine 15, expanding and imparting mechanical forces to rotor blades located within turbine 15. The aerodynamic lift, drag, and other forces that deflect the moving gas stream 14 are collectively called gas dynamic forces. These gas dynamic forces deliver mechanical energy to the rotor blades therefore rotating a shaft 16 that drives compressor 11 and performs other useful work. The expanded and cooled gas is finally expelled as exhaust 17.

The thermal efficiency of the gas turbine measures the amount of work produced from a given quantity of fuel. Thermal efficiency is a function of the magnitude of the pressure and temperature drop of gas 14 across turbine 15. Thus, for a constant pressure and temperature of exhaust gas 17, thermal efficiency improves in proportion to increases in the temperature and pressure of turbine inlet gas 14.

In conventional turbine designs, turbine inlet temperatures are limited to approximately 2200° F.–2600° F. by available rotor-blade materials and blade cooling technologies. Temperatures within combustion chamber 12, however, can be more than 3800° F. These ultra-hot combustion gases must be cooled by diluting them with excess compressed air 18 introduced in combustion chamber 12 to lower the temperature of inlet gas 14 to the minimum allowable temperature of 2200° F.–2600° F. The need to cool inlet gas 14 thus limits the thermal efficiency of conventional turbines.

Ceramic turbine blades have been proposed as a means of expanding the thermal operating envelope of the turbine. Ceramic materials retain structural strength at temperatures in excess of the current maximum allowable inlet temperatures and may potentially eliminate the present requirement to cool the combustion gases. Ceramic materials, however, lack the necessary strength and ductility to withstand the mechanical loads of the turbine environment. In particular, monolithic ceramic blades, similar in construction to conventional metal blades, are unable to meet tensile, fatigue, thermal shock, and ductility requirements even for short duration or partial load turbine operations.

The improvements in turbine engine efficiency possible by incorporating ceramics as a blade material are presently thus more theoretical than practicable. Turbine engine efficiency is therefore limited by the thermal and mechanical properties of existing blade materials and turbine construction.

SUMMARY OF THE INVENTION

According to the invention, a turbine rotor blade is supported and constrained under compression exclusively by fluid bearings particularly at the tip of the blade to maintain position of the blade about the spoke, thereby minimizing tensile and bending loads in the blade and allowing the use of blade materials which were hitherto infeasible, such as ceramics. The ceramic blade material permits higher temperatures and increased operating efficiencies in gas turbine engines.

According to a specific aspect of the invention, an integral fluid stream used for creating the fluid bearing also serves as a coolant medium for internal structures supporting the high-temperature (ceramic) blade, as well as an element of the blade-supporting structure through fluid passages in the blade-supporting structure. The integral fluid bearing, coolant medium and fluid structure therefore eliminates the need, or alternatively relaxes, design requirements for, the complex cooling and support structures and high-cost specialty materials of prior art designs. The resulting turbine is more reliable and less complex than heretofore known.

The present invention provides a unique turbine construction that minimizes the mechanical stresses on the turbine blades; enables use of ceramics as a blade material; and reduces the quantity of high-cost specialty materials that must be included in the turbine design.

Other features and advantages of the present invention will be described in greater detail hereinafter.

DETAILED DESCRIPTION OF PREFERRED EMBODIMENT

Conceptual Overview

Figure 1:
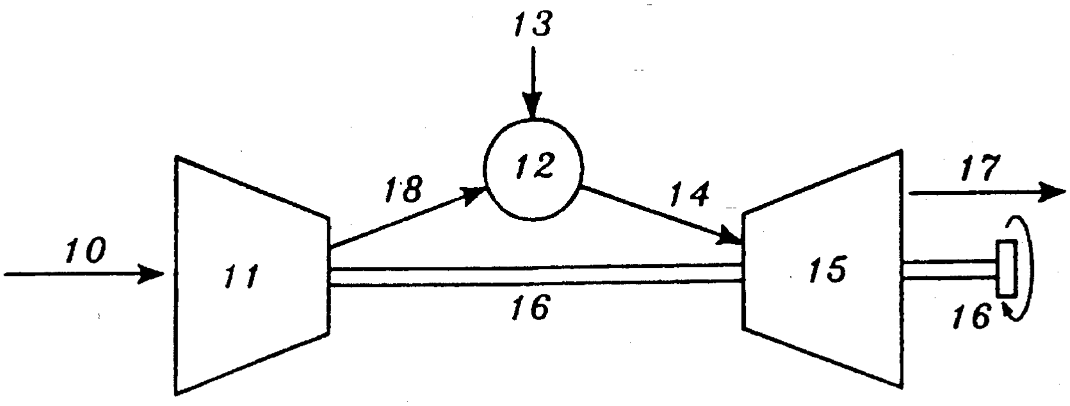
FIG. 1. PRIOR ART
FIG. 1 is a schematic diagram of a basic (prior art) gas turbine engine system.
Figure 2:
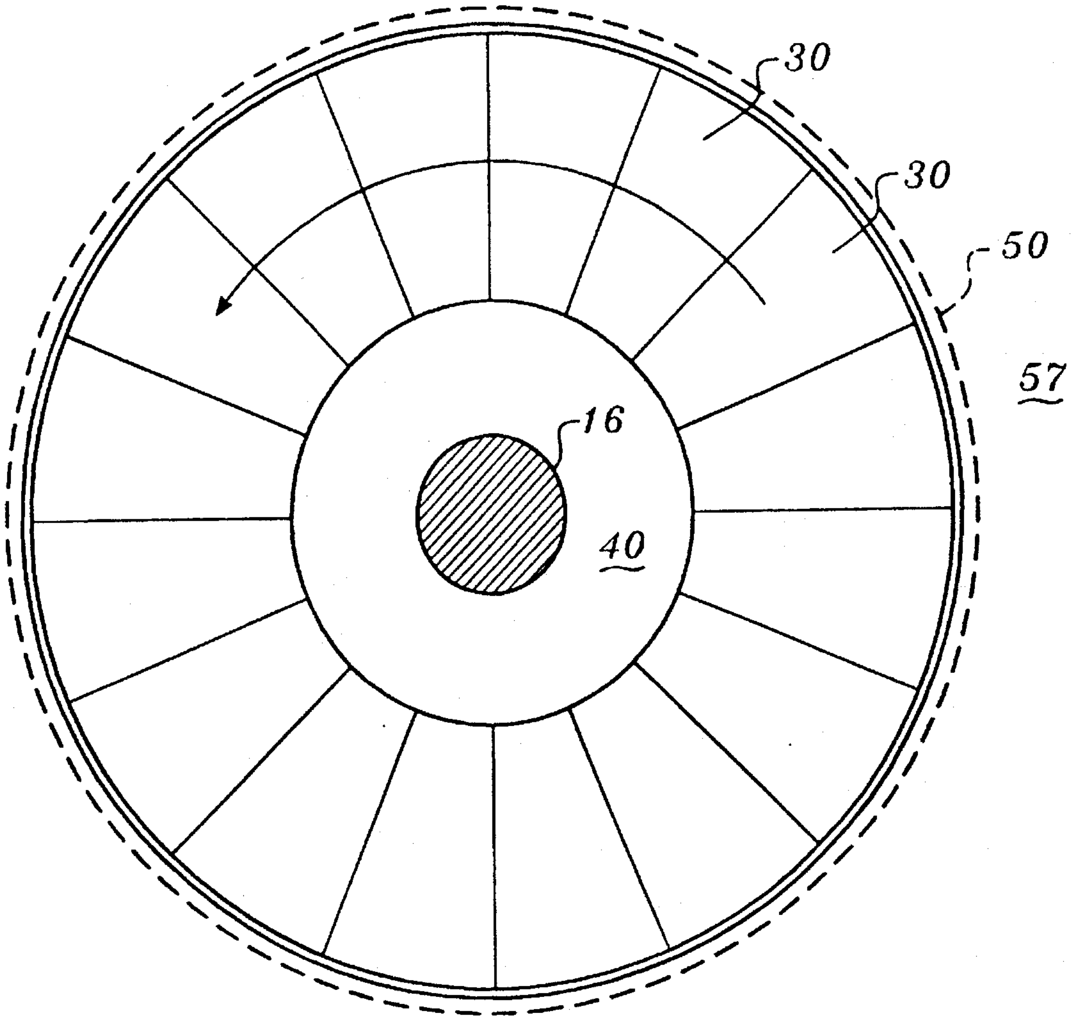
FIG. 2 is a front view of a turbine rotor according to an embodiment of the present invention.
Figure 3:
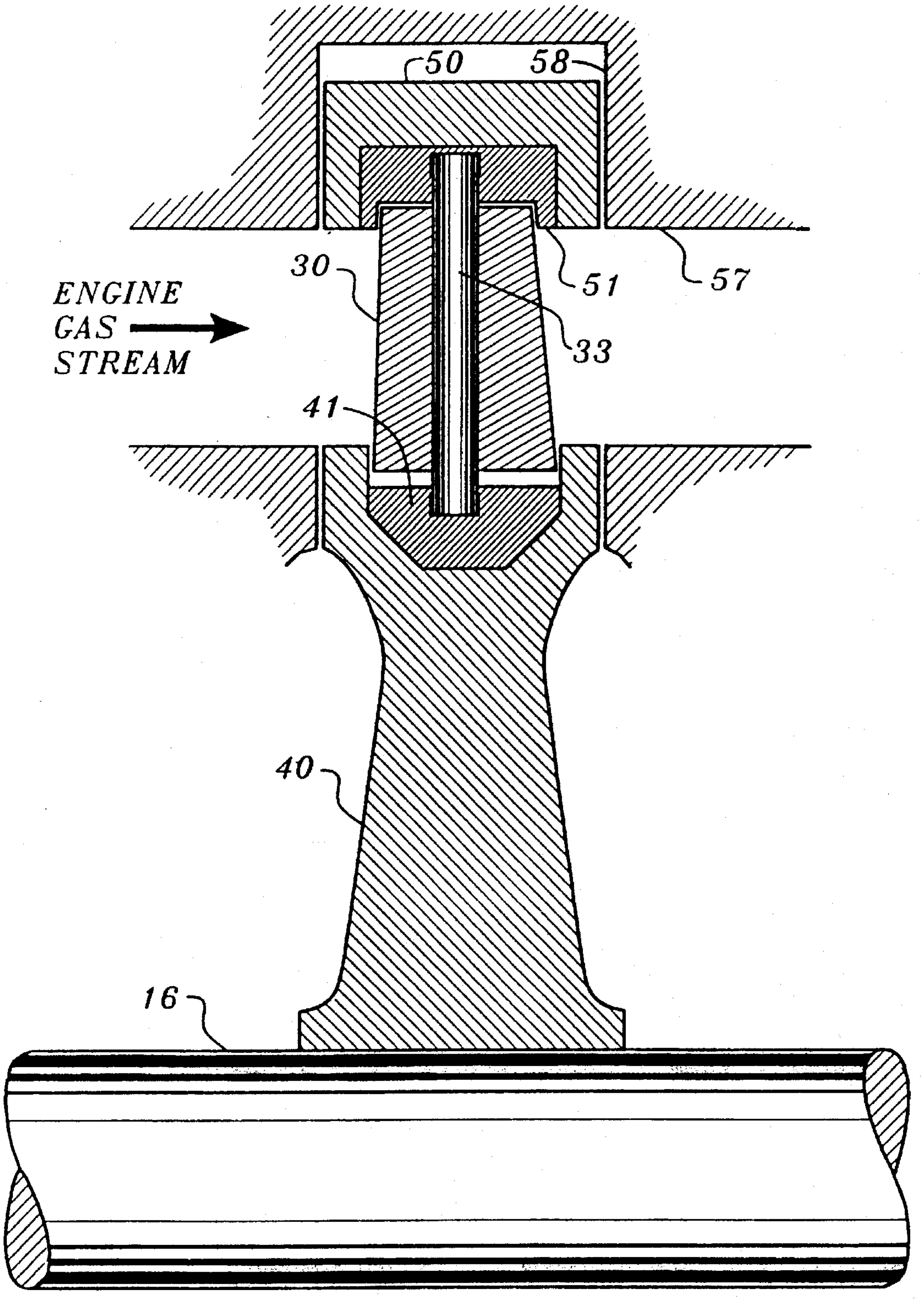
FIG. 3 is a side cutaway view of a turbine rotor according to an embodiment of the present invention.

With reference to FIGS. 2 and 3, a turbine according to an embodiment of the present invention includes a rotor assembly mounted on a hub 40 to an engine shaft 16, an end view of which is shown in FIG. 2. Hub 40 supports the rotor assembly, including a plurality of high-temperature blades 30 mounted on spokes 33 (FIG. 3), which may be tilted to a radial normal of the hub 40 at a selected design angle. This angle is selected to minimize spoke bending moment at design operating load. The hub 40 is operative to transfer torque from rotor blades 30 to shaft 16, shown in cross-section. A continuous circular rim 50 forms the outside of the rotor assembly, encircling the hub 40 outboard of the tips of each blade 30 and attached to a spoke-type mounting structure for the blades 30 as hereinafter explained. According to the invention, rim 50 rides in a groove 58 provided in a fixed casing 57 that encloses the spinning turbine. Blade cant angle can be controlled by varying the position of rim 50 relative to the blade root/hub interface. When rim 50 is aligned directly over hub 40, blade 30 has a cant angle of zero degrees.

According to the invention, a plurality of fluid bearings, preferably hydrostatic bearings, is provided between rim 50 and blade 30 and between hub 40 and blade 30 to fix blade 30 in all six axes of motion, as illustrated hereinafter. The hydrostatic bearings also place the blade in compression, thereby minimizing tensile loads and bending moment loads and thereby enabling the use of low-ductility, high-temperature-resistant blade materials, such as ceramic blade materials. For example, silicon nitride and silicon carbide may be used to fabricate blade 30. These materials retain structural strength at elevated temperatures substantially better than typical ductile metals employed to fabricate conventional rotor blades. Thus, higher turbine inlet temperatures are possible using designs employing the present invention, with corresponding improvements in engine thermal efficiency as compared to conventional turbine designs. Moreover, as hereinafter explained, the fluid is provided to the hydrostatic bearings in such a manner to maintain a desired temperature gradient through the cross-section of each blade assembly and structural integrity of each blade assembly.

Hardware Description

Figure 5:
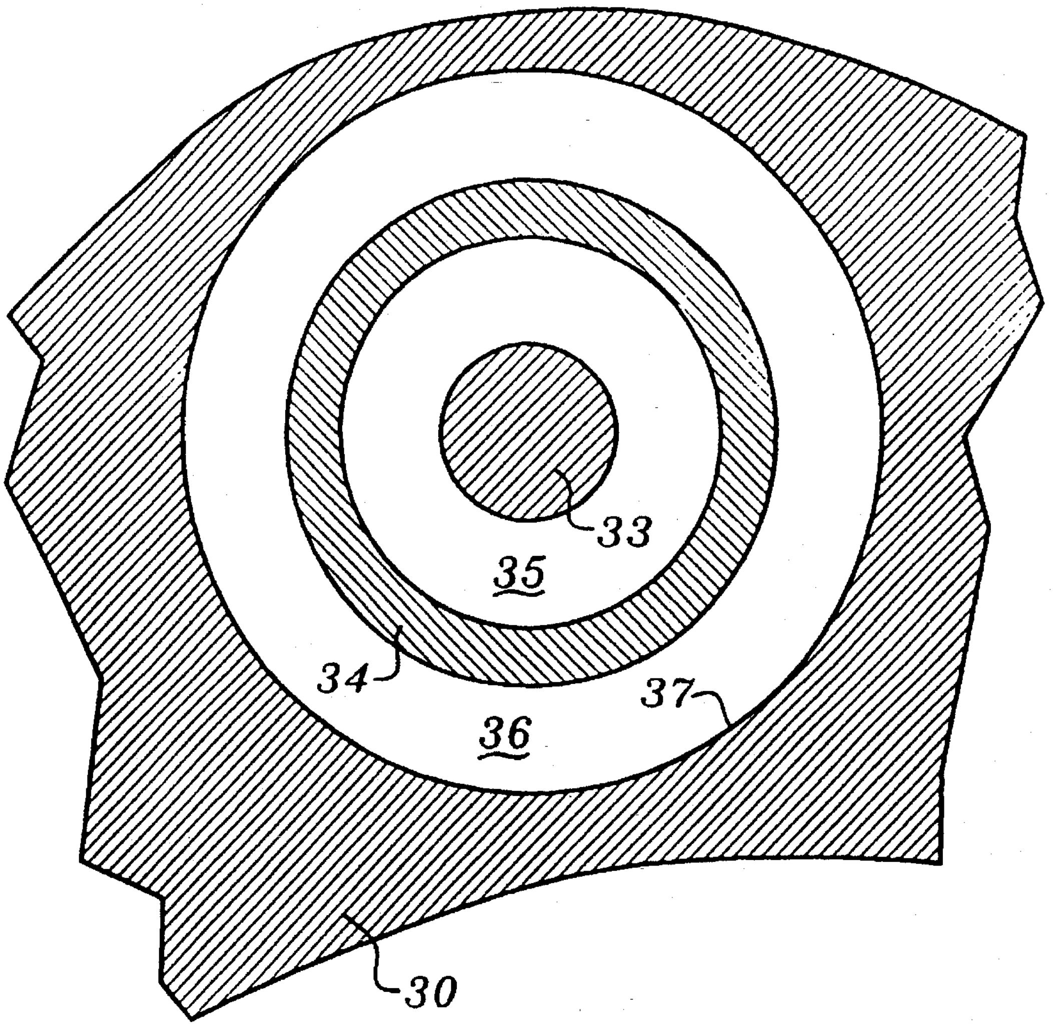
FIG. 5 is a cross-sectional view of the blade bore showing spoke, coolant tube and inner and outer channels according to an embodiment of the present invention.
Figure 7:
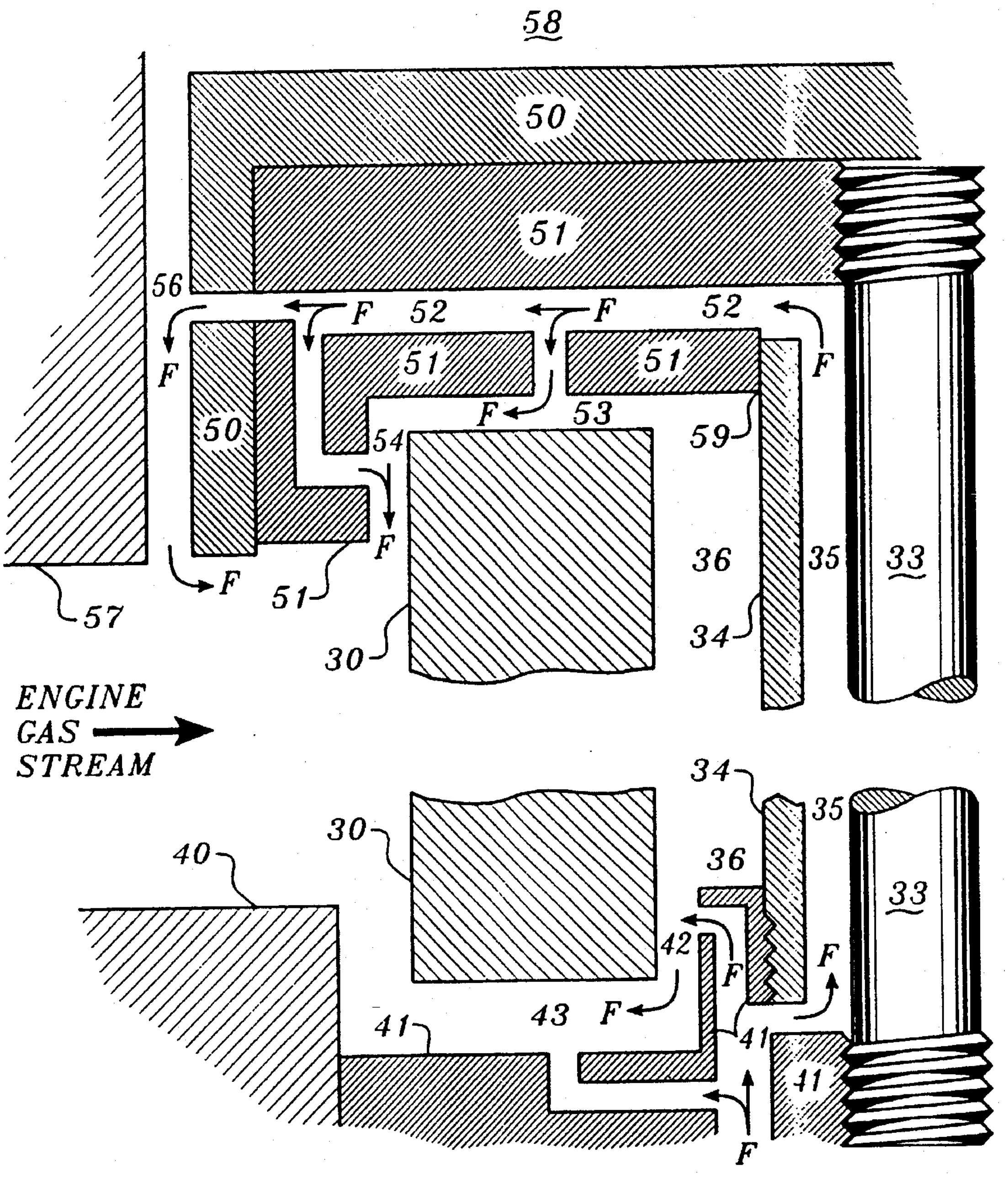
FIG. 7 is a schematic of fluid flow through the turbine casing, rim and hub according to an embodiment of the present invention.

FIG. 3 is a side cutaway view of the turbine rotor assembly of FIG. 2. A metal rod, or spoke 33, is anchored to hub 40, extends through each blade 30, and is anchored to metal rim 50 to connect rim 50 to the rotor via spoke 33. (A fluid tube 34 and spaces forming radial passages 35 and 36 surrounding the spoke 33, which are shown in FIG. 5 or FIG. 7, are not illustrated in FIG. 3 for purposes of clarity.) When the rotor assembly rotates about the shaft 16, the centrifugal load of each blade 30 transfers into rim 50, and rim 50 in turn transmits the centrifugal load to spokes 33 through each blade 30, which maintains the spokes 33 in tension. Therefore, spokes 33 carry the combined centrifugal load of all blades 30 distributed by rim 50, and rim 50 supports under circumferentially-directed tension only its own self-induced centrifugal load.

Figure 4:
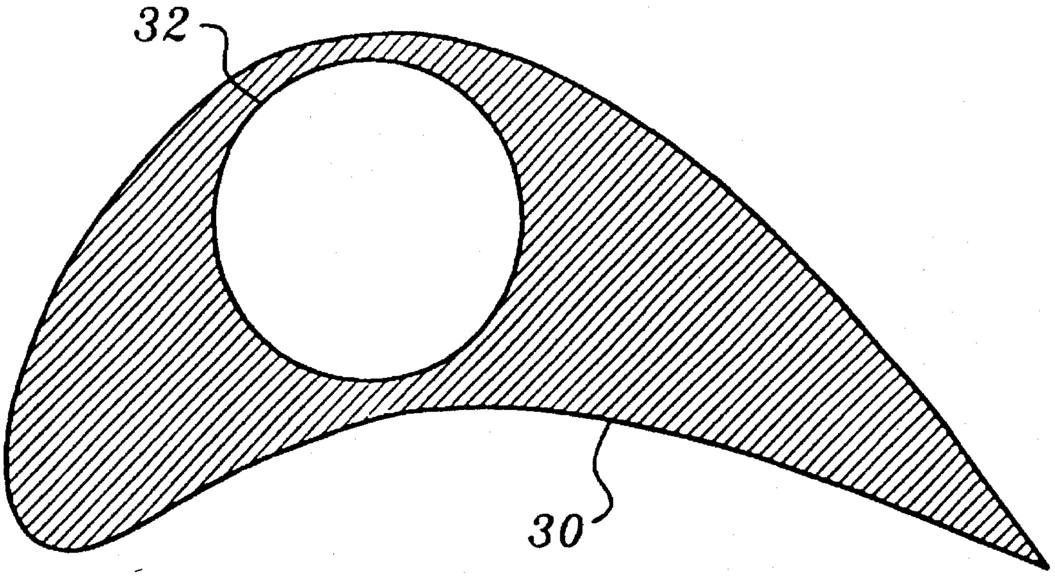
FIG. 4 is a chordwise profile of a rotor blade according to an embodiment of the present invention.

FIG. 4 shows the chordwise profile of a rotor blade 30 having a hollow straight cylindrical passage 32, herein referred to as the blade bore 32. The blade bore runs spanwise through blade 30 from base to tip. Spoke 33 (not shown) of smaller diameter than bore 32 extends through the blade bore 32. Thus when the rotor assembly is stationary, each blade 30 is free to slide radially a distance limited by hub 40 at the interior and rim 50 on the periphery.

FIG. 5 illustrates a cross-section of blade bore 32 showing spoke 33 in the center with a metal coolant tube 34 forming a sleeve enclosing spoke 33 where it would otherwise be exposed to the heat of the blade 30. Spoke 33 is preferably constructed of a high-tensile-strength material such as metal to withstand the tensile loads placed on the spoke 33.

Metal spoke materials, however, lose strength at elevated temperatures. To minimize the effects of thermal stress on the spokes 33 and to preserve structural integrity, annular channels may be used to form fluid passageways within the blade 30 and provide a cooling medium plenum. The arrangement of FIG. 5 comprises an inner annular channel 35, between spoke 33 and tube 34, and an outer annular channel 36 between tube 34 and bore wall 37 forming blade bore 32 of the blade 30. Fluid in outer channel 36 serves to insulate blade 30 from coolant tube 34. Fluid in inner channel 35 is for carrying high-pressure fluid from hub 40 to rim 50 (passages in hub 40 are not shown). The inner channel fluid is to (a) remove heat from spoke 33 and tube 34 and keep the temperature of spoke 33 in a range that preserves the spoke mechanical and tensile strength; and (b) feed hydrostatic fluid bearings between the rim 50 and the ceramic blades 30. As an alternative, the outer channel of FIG. 5 may also carry fluids for cooling as well as to feed blade tip bearings. Thus, the fluid is provided with a plurality of paths through the spoke structure thereby improving the thermodynamic efficiency of the cooling medium.

The fluid in the fluid passageways, in combination with management of the distribution of blade mass are useful for maximizing the temperature difference between the blade 30 and the spoke 33, thus maintaining integrity of the spoke material while permitting high turbine operating temperatures.

Figure 6:
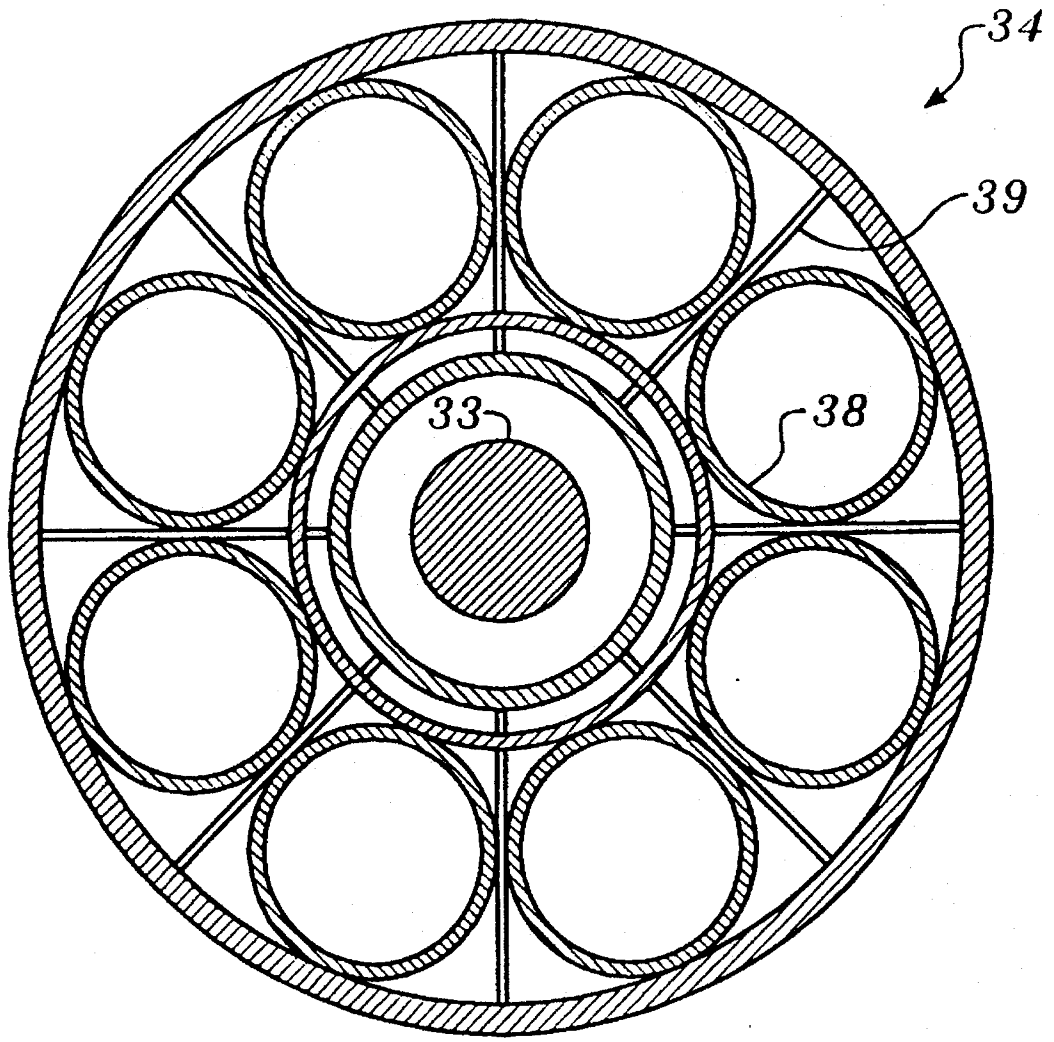
FIG. 6 is a cross sectional view of a coolant tube according to an alternate embodiment of the present invention.

Other configurations for coolant passages may be used, such as that shown in FIG. 6. In the tube construction of FIG. 6, coolant tube 34 comprises a plurality of small inner tubes 38 distributed around a circumference with at least one inner wall or tube and preferably a second concentric inner wall or tube, the smaller inner tubes 38 being separated by radial spacers 39. Inner tubes 38 may increase the rigidity of tube 34, or alternatively provide multiple channels of fluid flow. Some channels may be isolated from each other, while others may be in fluid communication. Using different channels, coolant flows through blade bore 32 may be:

(a) radially outward from hub to rim—as a preferred embodiment;

(b) radially outward with fluid return radially inward—which permits closed cooling systems; or (c) any flow elaboration or combination, including radial and circumferential, which appropriate to a particular application or design.

A variety of fluids may also be used simultaneously in different channels, including as examples: air, water, steam or a water/steam mixture. In one embodiment of the present invention, bypass compressor bleed air may be used. The compressor fluid is always at a lower temperature than the turbine gas stream and thus may serve as an appropriate cooling medium. Alternatively, the fluid may comprise water injected through delivery systems of the type known to those of skill in the art. Where liquid water is introduced as the coolant, temperatures present in the spoke 33 and within the turbine may cause the coolant to change phase and to be vented as gas. The latent energy required to effect the phase transformation absorbs a significant amount of heat energy as compared to a medium which does not undergo a phase change within the turbine. Still other fluid passage configurations are within the contemplation of the invention. For example, the spoke 33 itself may contain fluid passages for carrying fluid to the radial structures.

Alternative fluids, pressures, and channel structures to be employed in a specific application will be evident to one skilled in the art.

FIG. 7 illustrates a preferred structural connection of coolant tube 34 to hub 40 and rim 15. As shown in FIG. 7, coolant tube 34 is anchored into a hub-spoke block 41 and engages a rim-spoke block 51 in a sliding, fluid-tight bushing 59 that allows for differential radial expansion between tube 34 and rim 50. Similarly the spoke 33 is anchored, for example by thread mount, to the rim block 51. Thus, when the rotor rotates, hub 40, spokes 33, blocks 41 and 51, blades 30, tube 34, channel 35–36 and rim 50 rotate as a unit.

FIG. 7 also diagrams the structure of hydrostatic fluid bearings 53 and 54 used to support the turbine blades 30, and hydrostatic rim fluid bearing 56. The hydrostatic fluid bearings may comprise gas, liquid or combinations thereof. In FIG. 7, the fluid introduced from channel 35 enters rim block 51 where it is distributed via a plenum 52 to bearings 53, 54, and 56. The main bearing 53 carries the centrifugal load of the blade 30, while the axial and circumferential (herein referred to collectively as lateral) bearings 54 stabilize the axial and circumferential position and orientation of the tip of the blade.

In addition to feeding blade bearings, fluid carried to rim 50 may also be distributed via the plenum 52 to rim fluid bearings 56 between lateral portions of the rotating rim 50 and the fixed casing groove 58. These bearings locate rim 50 axially and prevent contact between rim 50 and casing 57. Not only do the rim fluid bearings 56 stabilize the rim in the groove 58 and cool the rim and the casing, the rim fluid bearings 56 provide a seal between the rim 50 and the casing to prevent engine gas from escaping the engine gas stream around the blade rim 50 into the groove 58 and on to lower pressure regions, which would otherwise cause loss of useful work. Alternatively or additionally, the plenum created by the casing 57 and the rim 50 (i.e., within the casing groove 58) can be pressurized independently of the turbine and by fluid external to the casing 57 to provide the seal and stabilization. External pressure may be applied through passages (not shown) through the casing 57 into the casing groove 58 from an external pressure source of adequate pressure.

Fluid bearings may also be provided at the base of blade 30, where fluid feeds hub lateral bearings 42 which locate the axial and circumferential position and orientation of the blade 30 base. A radial fluid bearing 43 at hub 40 may be employed to protect blade 30 from striking hub 40 when fluid pressure is applied during start-up, pushing the ceramic blade 30 toward the hub 40.

Figure 8:
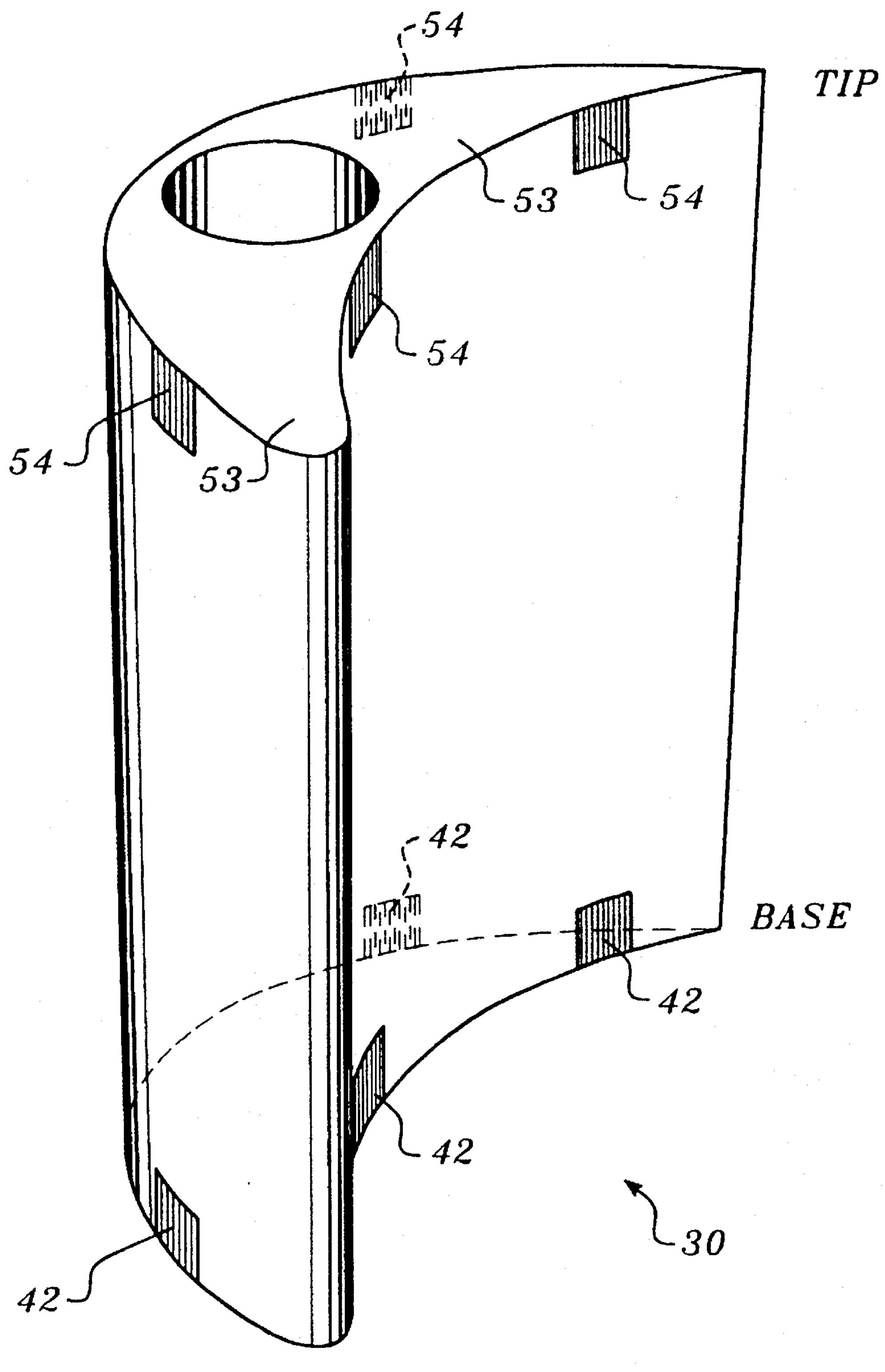
FIG. 8 is a perspective drawing of a rotor blade showing the location of fluid bearing pads according to an embodiment of the present invention.

FIG. 8 shows the possible location on a blade 30 of various fluid bearings. The main bearing 53 is located at the tip, Possible locations of lateral bearings 54 are at the tip and lateral bearings 42 are at the base of the blade 30 distributed to be adjacent various points of stress or potential blade-to-rim or blade-to-hub contact. The main bearing 53 has a surface which carries the centrifugal load of blade 30 and which covers virtually the entire footprint of the blade tip, to distribute the centrifugal load as widely as possible. Lateral blade-bearing surfaces 42 require less area than bearing 53 because the lateral loads are much less than the centrifugal load borne by main bearing 53.

Together, the multiple hydrostatic fluid bearings constrain blade 30 in all six axes of motion. Thus, when the rotor is in operation, blade 30 is optionally reinforced by pressurized fluid within its core as well as being compressed and positionally constrained entirely by fluid under pressure, which more evenly distributes bearing forces over the bearing surface and the interior of the blade 30 and prevents tensile loads and point loads form being placed on the brittle blade material. Laterally-placed fluid bearings 42 and 54 hold the hollow bore 32 of the blade 30 in an accurate position around tube 34 and maintain blade 30 oriented precisely in engine gas stream 14.

The hydrostatic fluid bearings of the present invention also contribute to improvements in engine efficiency. Fluid pressure in all bearings is much higher than engine gas stream pressure 14, so exhaust from all fluid bearings is expelled into gas stream 14 and adds to the mass flow of stream 14. Moreover, this exhaust effectively seals the gap 56 between rim 50 and casing 57 as well as the gaps around the base 43 and tips 53 and 54 of blades 30, thereby decreasing main gas stream leakage and improving efficiency over current engine designs.

Figure 9:
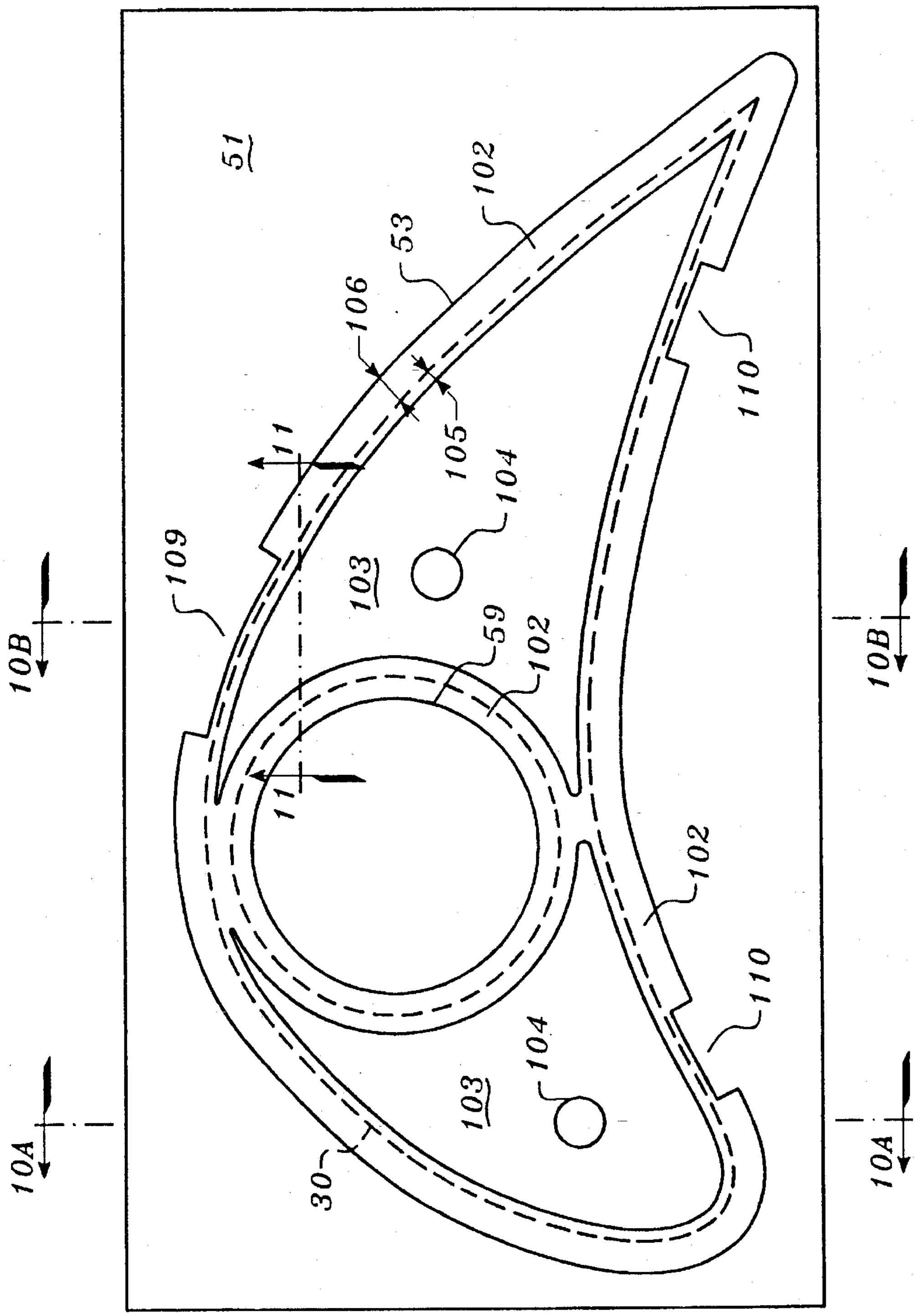
FIG. 9 is a facing view of a rim radial blade bearing according to an embodiment of the present invention.
Figure 10A:
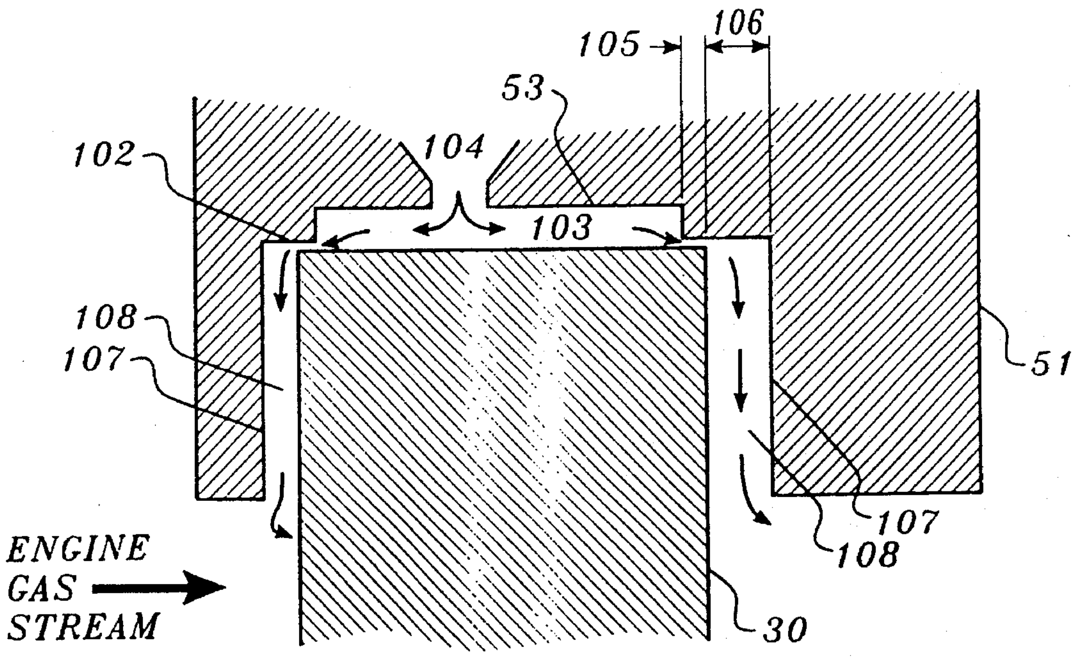
FIG. 10A is a cross sectional view of a blade hydrostatic bearing taken at section A—A of FIG. 9.
Figure 10B:
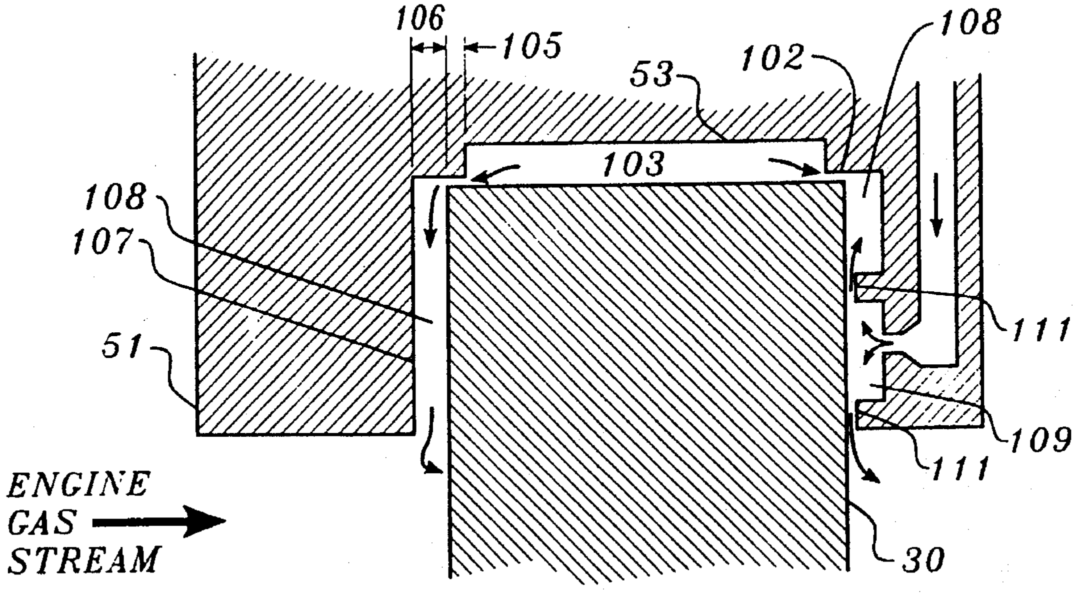
FIG. 10B is a cross sectional view of a blade hydrostatic bearing according one embodiment.

FIG. 9, FIG. 10A and FIG. 10B illustrate in detail a main blade bearing 53 in accordance with the invention. In FIG. 9, the face of a rim radial blade bearing 53 is shown as viewed radially from hub 40 looking toward rim block 51 with the blade 30 removed. A circular opening in rim block 51 forms fluid tube bushing 59. The location of the perimeter of blade 30, as it floats over the bearing face, is shown by the dotted line. A raised ridge with face 102 surrounds two pressure pads 103, 103' one forward and one aft on the blade Face 102 is wider than required to create gap 105 around pressure pads 103. Pads 103 are shaped to take advantage of the full footprint of the blade 30, in order to reduce the pressure required to suspend the blade 30. Each pad 103 is fed through orifices 104 in rim block 51. Extension 106 creates volume 108 between blade 30 and the rim block skirt 107 into which the bearings exhaust and thereby expel fluid into the engine gas stream.

Also shown in FIG. 9 are three lateral hydrostatic bearings, one labeled 109 and two labeled 110, disposed around the perimeter of the blade 30. A similarly-positioned set of lateral hydrostatic bearings (not shown) may be provided at the base of blade 30 adjacent the hub 40 to provide similar load-carrying functions.

The arrangement of the bearings in FIG. 9, showing three lateral bearings around the tip, is an alternative arrangement to FIG. 8 in which four bearings are located around the base and tip. Bearing 109 absorbs the gas-dynamic load (lift and drag) from blade 30. Bearing 109 and the remaining lateral bearings 110, in combination, hold blade 30 in position around spoke 33 and keep blade 30 from rotating around spoke 33.

Figure 11:
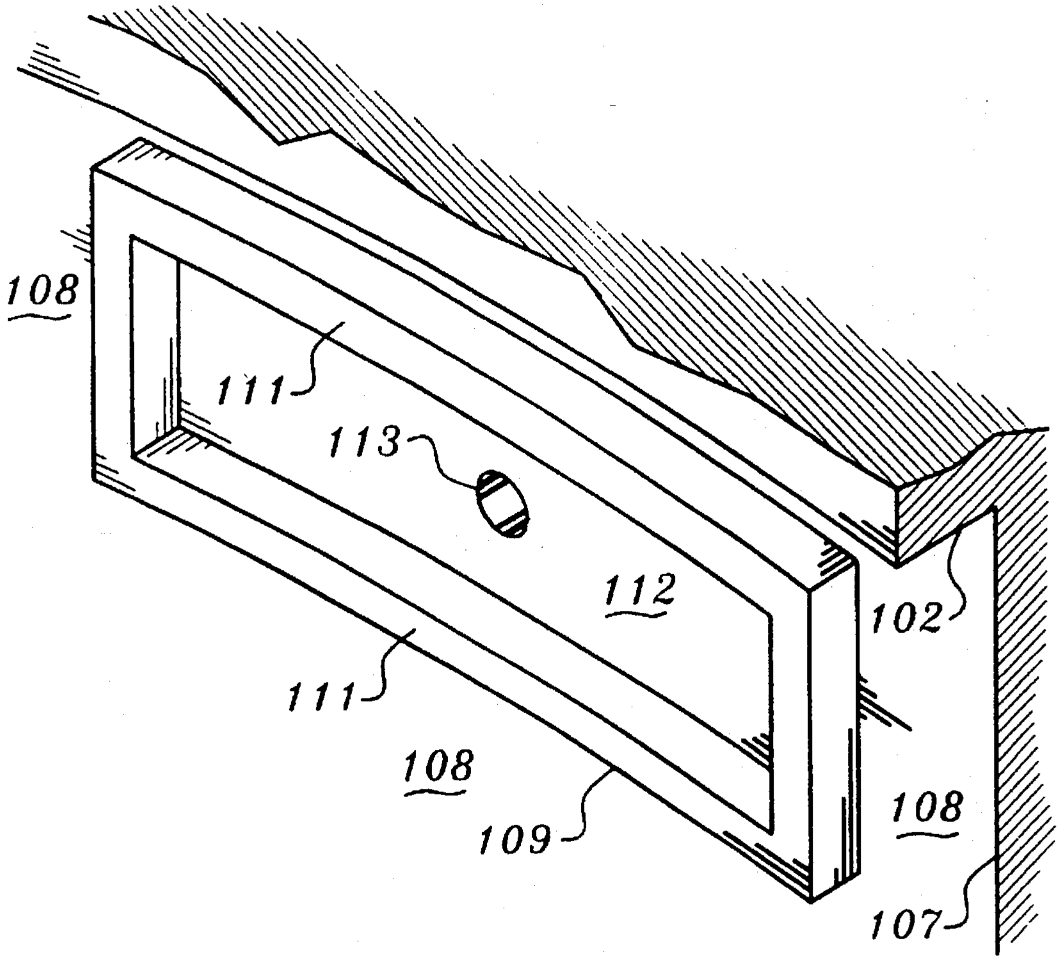
FIG. 11 is a perspective drawing of a hydrostatic bearing according to one embodiment.

FIGS. 10A, 10B and 11 show the construction of the hydrostatic bearings in greater detail. FIGS. 10A and 10B are cross-sections taken at sections A—A and B—B respectively of FIG. 9. FIGS. 10A and 10B illustrate fluid exhaust 108 between skirt 107 and blade 30. Bearing 109 is also shown in FIG. 10B. Further, FIG. 11 shows in perspective a view of bearing 109 and additionally a short segment of radial bearing ridge face 102 and skirt 107. Set into skirt 107 is lateral bearing 109 with ridge faces 111, pad area 112, and fluid orifice 113. Exhaust area 108 surrounds bearing 109. Bearings 110 and the bearings at the base are similarly constructed.

Engine operation

From the perspective of the turbine user, the turbine of the present invention operates in the same manner as a conventional turbine engine. When starting the turbine of the present invention, however, it is typically necessary to first precharge the fluid bearings to prevent high-speed dynamic contact of blade 30 with rim 50. Before starting the rotor, fluid pressure is therefore applied gradually to all fluid bearings in the engine system. The gradual application of fluid pressure eases blades 30 away from rim 50 until blades 30 rest on the hub 40 (or on bearings 43 if provided). Referring to FIGS. 8–11, fluid supply pressure at 104 is brought up to operating pressure, forcing gaps 105 wide open so fluid sprays therethrough into exhaust 108, the pressure on the blade 30 at pad 103 being very small. The rotor is then started. As the rotor spins faster, blades 30 are forced radially outwardly toward bearings 53 by centrifugal force, gradually closing gaps 105 until the rotor attains operating speed. The gaps 105 are then minimized for the duration of operation, allowing for some fluid leakage.

Similarly, when stopping the engine, rotation is stopped before fluid pressure is decreased to prevent blade 30 from vibrating about spoke 33 or impacting rim 50 while the rotor spools down. Fluid pressure at 104 is maintained while the engine spools down, and blades 30 drift slowly away from rim 50 until blades 30 rest on hub 40. Gap 105 opens under pressure differential, as the pressure from pads 103 is reduced to a small value. Once the engine stops, fluid pressure can be removed from all bearings.

Preferred embodiments of the present invention have been described. Variations and modifications will be readily apparent to those of ordinary skill in the art. For example, a variety of fluids may be used to form the fluid bearings herein described. In addition, the turbine construction is useful for turbines other than common gas turbine engines and in turbine designs having more than one cycle or stage. For these reasons, the present invention is to be construed in light of the claims.

What is claimed is:

1. A turbine comprising:

a rim;

a hub;

a plurality of turbine blades disposed between said rim and said hub;

a spoke passing through an interior portion of each one of said turbine blades, said spoke having a first end coupled to said rim and a second end coupled to said hub;

a first bearing disposed between a root portion of each one of said blades and said hub;

a second bearing disposed between a tip portion of each one of said blades and said rim; and a third bearing disposed to position each one of said blades laterally and disposed between a lateral surface of said blade and at least one of a blade tip bearing surface and a blade base bearing surface.

2. The turbine of claim 1, wherein said first, said second and said third bearings are fluid bearings in fluid communication with one another.

3. The turbine of claim 1, further including fluid passage means for passing fluid to said fluid bearing means within said blade.

4. The turbine of claim 1, wherein said spoke comprises a metal.

5. The turbine of claim 4, wherein said turbine blades comprise a ceramic.

6. The turbine of claim 1, wherein said turbine is enclosed in an engine casing and wherein said rim is located in a groove within said engine casing, further comprising a plurality of rim fluid bearings disposed between said rim and said casing.

7. The turbine of claim 6 wherein said rim fluid bearings comprise passages to lateral portions of said rim confronting said groove.

8. The turbine of claim 1, wherein at least said second bearing and said third bearing are fluid bearings.

9. The turbine of claim 8, wherein said fluid bearings comprise $H_2O$.

10. The turbine of claim 8, wherein said fluid bearings comprise a gas.

11. The turbine of claim 8 further comprising means for expelling a fluid contained in at least one of said fluid bearings into a gas stream of said turbine for sealing space between said rim and each one of said blades.

12. A turbine engine comprising:

a compressor stage;

a combuster coupled to said compressor stage; and a turbine coupled to said combuster and having:

a continuous rim having an uninterrupted perimeter;

a hub;

a plurality of turbine blades disposed between said rim and said hub;

for each one of said turbine blades, a spoke, passing through an interior portion of said turbine blade, having a first end connected to said rim and a second end coupled to said hub, wherein said turbine further comprises:

a first bearing means disposed between a root portion of each one of said blades and said hub;

a second bearing means disposed between a tip portion of each one of said blades and said hub; and a third bearing means disposed to position each one of said blades laterally and disposed between a lateral surface of each one of said blades and at least one of a blade tip bearing surface and a blade base bearing surface.

13. A turbine engine comprising:

a compressor stage;

a combuster coupled to said compressor stage; and a turbine coupled to said combuster and having:

a continuous rim having an uninterrupted perimeter;

a hub;

a plurality of turbine blades disposed between said rim and said hub;

for each one of said turbine blades, a spoke, passing through an interior portion of said turbine blade, having a first end coupled to said rim and a second end coupled to said hub;

a first bearing means disposed between a root portion of each one of said blades and said hub;

a second bearing means disposed between a tip portion of each one of said blades and said hub;

a third bearing means disposed to position each one of said blades laterally and disposed between a lateral surface of each one of said blades and at least one of a blade tip bearing surface and a blade base bearing surface; and wherein at least said second bearing means and said third bearing means are fluid bearings.

14. A turbine engine comprising:

a compressor stage;

a combuster coupled to said compressor stage; and a turbine coupled to said combuster and having:

a continuous rim having an uninterrupted perimeter;

a hub;

a plurality of turbine blades disposed between said rim and said hub;

for each one of said turbine blades, a spoke, passing through an interior portion of said turbine blade, having a first end coupled to said rim and a second end coupled to said hub;

a first bearing means disposed between a root portion of each one of said blades and said hub;

a second bearing means disposed between a tip portion of each one of said blades and said hub;

a third bearing means disposed to position each one of said blades laterally and disposed between a lateral surface of each one of said blades and at least one of a base tip bearing surface and a blade base bearing surface; and wherein said spoke comprises a metal.

15. The turbine of claim 14, wherein said turbine blades comprise a ceramic material.

* * * * *